(12) United States Patent
Nakamura et al.

(10) Patent No.: US 10,976,447 B2
(45) Date of Patent: Apr. 13, 2021

(54) AZIMUTH ANGLE CALCULATING DEVICE, AND METHOD OF CALCULATING AZIMUTH ANGLE

(71) Applicant: Furuno Electric Co., Ltd., Nishinomiya (JP)

(72) Inventors: Hiraku Nakamura, Nishinomiya (JP); Hiroyuki Toda, Nishinomiya (JP); Naomi Fujisawa, Nishinomiya (JP)

(73) Assignee: Furuno Electric Co., Ltd., Nishinomiya (JP)

( * ) Notice: Subject to any disclaimer, the term of this patent is extended or adjusted under 35 U.S.C. 154(b) by 0 days.

(21) Appl. No.: 16/478,114

(22) PCT Filed: Dec. 12, 2017

(86) PCT No.: PCT/JP2017/044543
§ 371 (c)(1),
(2) Date: Jul. 15, 2019

(87) PCT Pub. No.: WO2018/135187
PCT Pub. Date: Jul. 26, 2018

(65) Prior Publication Data
US 2019/0369267 A1   Dec. 5, 2019

(30) Foreign Application Priority Data

Jan. 17, 2017   (JP) .................... JP2017-006094

(51) Int. Cl.
*G01S 19/55* (2010.01)
*G01S 3/46* (2006.01)
(Continued)

(52) U.S. Cl.
CPC ............ *G01S 19/55* (2013.01); *G01S 3/46* (2013.01); *G01S 7/03* (2013.01); *H01Q 3/04* (2013.01)

(58) Field of Classification Search
CPC ........ H01Q 21/22; H01Q 21/28; H01Q 21/30; H01Q 21/293; G01S 19/43; G01S 19/47; G01S 19/53; G01S 19/54
(Continued)

(56) References Cited

U.S. PATENT DOCUMENTS

| 5,506,588 A * | 4/1996 | Diefes ............... G01C 21/00 342/357.27 |
| 7,026,982 B2 * | 4/2006 | Toda ................ G01S 19/44 342/357.27 |

(Continued)

FOREIGN PATENT DOCUMENTS

JP   2001194442 A   7/2001

OTHER PUBLICATIONS

ISA Japan Patent Office, International Search Report Issued in Application No. PCT/JP2017/044543, dated Mar. 20, 2018, WIPO, 4 pages.

*Primary Examiner* — Tung X Le
(74) *Attorney, Agent, or Firm* — Alleman Hall Creasman & Tuttle LLP (57) ABSTRACT

A plurality of antennas may be arranged at positions non-linear to each other. Processing circuitry may set an initial value of one of an attitude angle and an azimuth angle of an azimuth angle calculating device. An integer value bias of a carrier phase difference between at least two groups of antennas may be determined by using the initial value. A base-line vector between the at least two groups of antennas may be calculated by using the integer value bias corresponding to the group of antennas. A multiple base-line verification may be performed, in which validity of the initial value is verified by using each of the base-line vectors calculated using the integer value bias. An azimuth angle (Continued)

may be calculated by using the integer value bias when the multiple base-line verification is successful.

13 Claims, 5 Drawing Sheets (51) Int. Cl.
    *G01S 7/03*           (2006.01)
    *H01Q 3/04*          (2006.01)

(58) Field of Classification Search
    USPC .......................................... 343/853; 342/375
    See application file for complete search history.

(56) References Cited

U.S. PATENT DOCUMENTS

| | | | |
|---|---|---|---|
| 10,877,163 B2* | 12/2020 | Nakamura | G01S 19/53 |
| 2007/0075896 A1* | 4/2007 | Whitehead | G01S 19/53 |
| | | | 342/357.36 |
| 2008/0252524 A1* | 10/2008 | Chu | H01Q 3/2682 |
| | | | 342/375 |
| 2011/0241931 A1* | 10/2011 | Krich | G01S 7/2813 |
| | | | 342/159 |
| 2013/0057432 A1* | 3/2013 | Rajagopal | H01Q 3/26 |
| | | | 342/368 |
| 2015/0168562 A1* | 6/2015 | Nichols | G01S 19/54 |
| | | | 342/357.37 |
| 2017/0363749 A1* | 12/2017 | Fujisawa | G01S 19/54 |
| 2018/0259653 A1* | 9/2018 | Nakamura | G01S 19/53 |

* cited by examiner

AZIMUTH ANGLE CALCULATING DEVICE, AND METHOD OF CALCULATING AZIMUTH ANGLE

TECHNICAL FIELD

The present disclosure relates to an azimuth angle calculating device, a method of calculating an azimuth angle, and an azimuth angle calculation program, which calculate an azimuth angle of a ship etc. using GNSS signals.

BACKGROUND ART

Conventionally, various methods of calculating an attitude angle or azimuth angle of a movable body, such as a ship, using positioning signals, such as GNSS signals, are devised.

For example, a movable body attitude angle measuring device disclosed in Patent Document 1 is provided with two satellite signal receiving antennas. One of the satellite signal receiving antennas is a movable antenna. The movable body attitude angle measuring device measures the attitude angle using carrier phases of the satellite signals received by the two satellite signal receiving antennas.

The movable body attitude angle measuring device determines an integer value bias using the acquired carrier phases and the positions when the carrier phases are acquired. The movable body attitude angle measuring device measures the attitude angle using this integer value bias.

REFERENCE DOCUMENT OF CONVENTIONAL ART

Patent Document 1: JP2001-194442A

DESCRIPTION OF THE DISCLOSURE

Problems to be Solved by the Disclosure

However, in the movable body attitude angle measuring device disclosed in Patent Document 1, the antenna has to be moved, and therefore, the mechanism becomes complicated.

Note that, for the conventional determination of the integer value bias, a floating ambiguity is first estimated. Generally, an estimation using a filter, such as a Kalman filter, is applied to the estimation of the floating ambiguity. The estimation with the filter, such as a Kalman filter, takes time, and owing to this, the calculation of an initial value of the attitude angle and an initial value of the azimuth angle takes time.

Moreover, the device is provided with a magnetic sensor, and it is also provided with a configuration which sets the azimuth angle obtained using the terrestrial magnetism detected by the magnetic sensor to the initial value.

However, by the configuration using the magnetic sensor, the azimuth angle detected by the magnetic sensor increases in an error at a place where many metal components exist around, and at a place where a strong magnetic field exists. If the initial value with the large error is used, the error of the azimuth angle which is subsequently and continuously measured also becomes large, and therefore, the azimuth angle cannot be measured with high precision.

Therefore, one purpose of the present disclosure is to provide an azimuth angle calculating device, a method of calculating an azimuth angle, and an azimuth angle calculation program, capable of securely performing an initial calculation of the azimuth angle to be measured, with a simple configuration and at high speed.

SUMMARY OF THE DISCLOSURE

An azimuth angle calculating device according to one aspect of the present disclosure may include at least three antennas, an initial value setting module, an integer value bias determining module, a base-line vector calculating module, a verifying module, and an azimuth angle calculating module. The at least three antennas may be arranged at positions non-linear to each other. The initial value setting module may set an initial value of one of an attitude angle and an azimuth angle of the azimuth angle calculating device. The integer value bias determining module may determine an integer value bias of a carrier phase difference between at least two groups of antennas by using the initial value. The base-line vector calculating module may calculate a base-line vector between the at least two groups of antennas, by using the integer value bias corresponding to the group of antennas. The verifying module may perform a multiple base-line verification in which validity of the initial value is verified by using each of the base-line vectors calculated using the integer value bias. The azimuth angle calculating module may calculate an azimuth angle by using the integer value bias when the multiple base-line verification is successful.

According to this configuration, the integer value bias is verified using the multiple base-line verification, and the integer value bias determined to be successful in the verification is adopted so that the initial value of the integer value bias is determined at high speed, without performing any complex processing such as a Kalman filter.

Effect of the Disclosure

According to the present disclosure, the initial calculation of the azimuth angle to be measured can securely be performed with the simple configuration and at high speed.

MODES FOR CARRYING OUT THE DISCLOSURE

Figure 1:
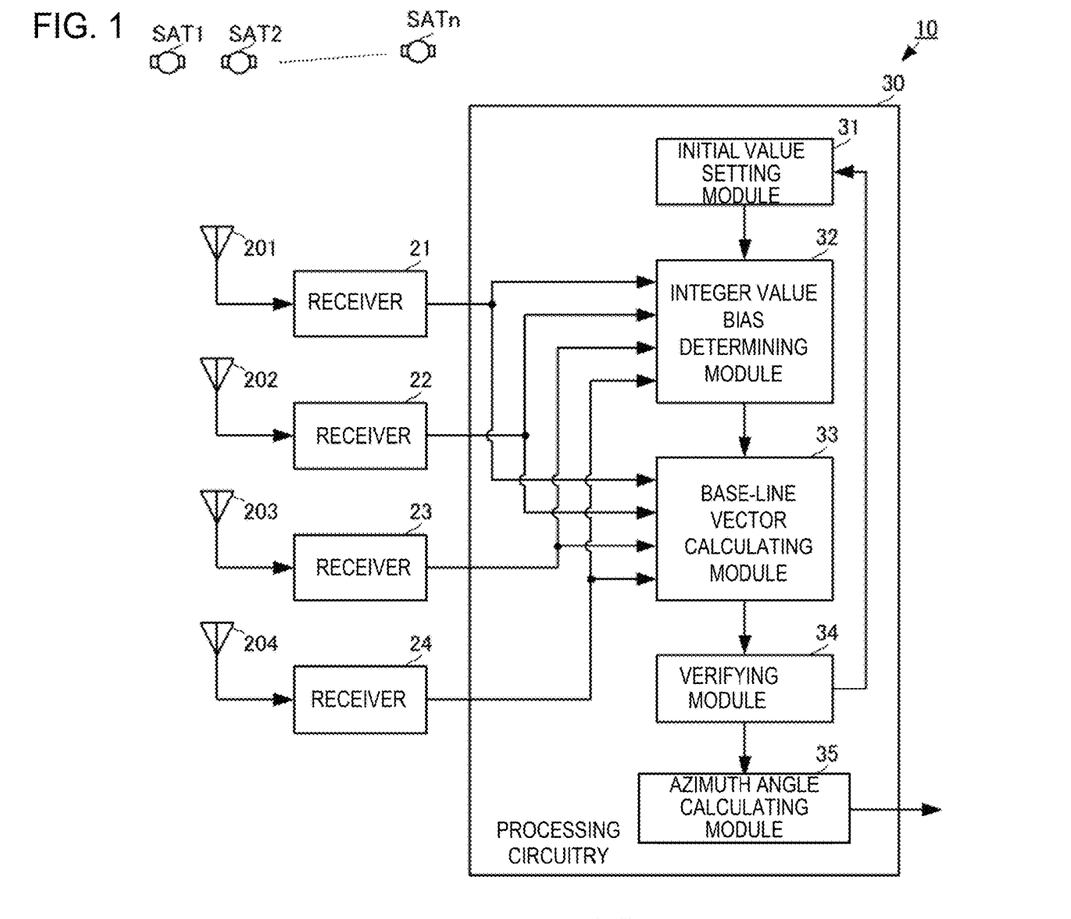
FIG. 1 is a functional block diagram of an azimuth angle calculating device according to one embodiment of the present disclosure.
Figure 2:
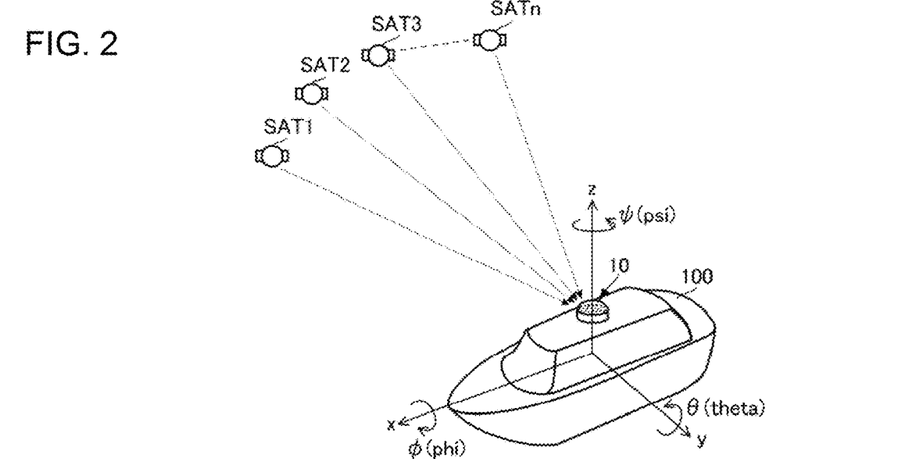
FIG. 2 is a view illustrating one example of a use mode of the azimuth angle calculating device according to the embodiment of the present disclosure.
Figure 3:
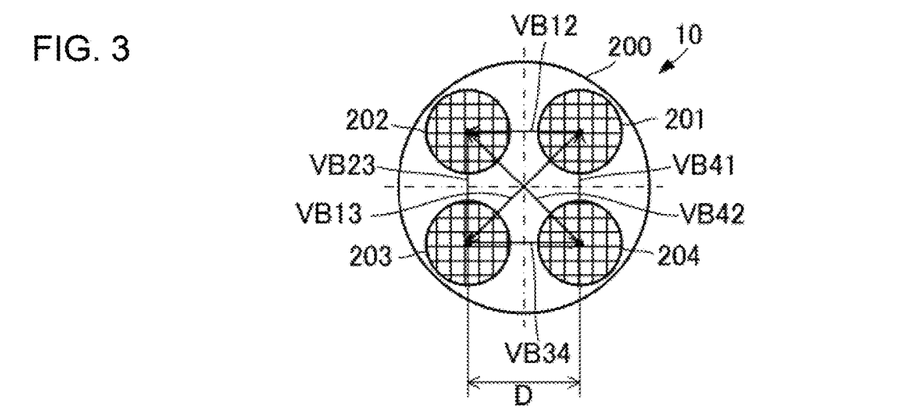
FIG. 3 is a view illustrating one example of an antenna layout of the azimuth angle calculating device according to the embodiment of the present disclosure.

An azimuth angle calculating device, a method of calculating an azimuth angle, and an azimuth angle calculation program according to one embodiment of the present disclosure will be described with reference to the figures. FIG. 1 is a functional block diagram of the azimuth angle calculating device according to this embodiment of the present disclosure. FIG. 2 is a view illustrating one example of a use mode of the azimuth angle calculating device according to this embodiment of the present disclosure. FIG. 3 is a view illustrating one example of an antenna layout of the azimuth angle calculating device according to this embodiment of the present disclosure.

As illustrated in FIG. 1, an azimuth angle calculating device 10 may include antennas 201, 202, 203, and 204, receivers 21, 22, 23, and 24, and a processing circuitry 30.

As illustrated in FIGS. 2 and 3, the azimuth angle calculating device 10 may be accommodated in a casing 200 and may be grounded to a ship hull 100. Here, the azimuth angle calculating device 10 may be arranged so that wave receiving surfaces of the antennas 201, 202, 203, and 204 are oriented toward the zenith. Note that, although the hull 100 is illustrated herein as one example, it may be other movable bodies or objects which require a calculation of an attitude angle and an azimuth angle.

When the casing 200 is seen in a plan view, the antennas 201, 202, 203, and 204 may be disposed on the casing 200 so that the centers thereof are located at four corners of a square. A distance between the center of the antenna 201 and the center of the antenna 202 may be D. Similarly, a distance between the center of the antenna 202 and the center of the antenna 203, a distance between the center of the antenna 203 and the center of the antenna 204, and a distance between the center of the antenna 204 and the center of the antenna 201 may also be D. A distance between the center of the antenna 201 and the center of the antenna 203 and a distance between the center of the antenna 202 and the center of the antenna 204 may be $\sqrt{(2)} \times D$.

In such a configuration, a plurality of base-line vectors can be set as illustrated in FIG. 3. Note that the setting of the base-line vectors illustrated in FIG. 3 is one example, and the setting of an originating point and a terminating point of each base-line vector may be reversed.

The base-line vector VB12 may have the antenna 201 as the originating point and the antenna 202 as the terminating point. The base-line vector VB23 may have the antenna 202 as the originating point and the antenna 203 as the terminating point. The base-line vector VB34 may have the antenna 203 as the originating point and the antenna 204 as the terminating point. The base-line vector VB41 may have the antenna 204 as the originating point and the antenna 201 as the terminating point. The base-line vector VB13 may have the antenna 201 as the originating point and the antenna 203 as the terminating point. The base-line vector VB42 may have the antenna 204 as the originating point and the antenna 202 as the terminating point.

The base-line vector VB12 and the base-line vector VB34 may be vectors which are parallel to each other and are opposite in the direction mutually. The base-line vector VB23 and the base-line vector VB41 may be vectors which are parallel to each other and are opposite in the direction mutually. An angle formed by the base-line vector VB12 and the base-line vector VB23 and VB41 may be 90°. An angle formed by the base-line vector VB13 and the base-line vector VB42 may be 90°.

An angle formed by the base-line vector VB13 and the base-line vector VB12 may be 45°. An angle formed by the base-line vector VB41 and the base-line vector VB42 may be 45°.

Thus, the relative spatial relationship of the plurality of antennas 201, 202, 203, and 204, the magnitude and the direction of the base-line vector VB, and the angles formed by the plurality of base-line vectors VB may be known. The magnitude and the direction of the base-lines vector VB, and the angle formed by the plurality of base-line vectors VB may be stored in a memory (not illustrated) of the processing circuitry 30 as a known base-line length Df and a known offset angle αf.

The antenna 201 may receive positioning signals from a plurality of positioning satellites SAT1, SAT2, . . . , and SATn, and output them to the receiver 21. The antenna 202 may receive positioning signals from the plurality of positioning satellites SAT1, SAT2, . . . , and SATn, and output them to the receiver 22. The antenna 203 may receive positioning signals from the plurality of positioning satellites SAT1, SAT2, . . . , and SATn, and output them to the receiver 23. The antenna 204 may receive positioning signals from the plurality of positioning satellites SAT1, SAT2, . . . , and SATn, and output them to the receiver 24. The positioning satellites SAT1, SAT2, . . . , and SATn are satellites, for example, used by a GNSS (Global Navigation Satellite System), such as GPS Satellites, and the positioning signal is a signal, for example, used by the GNSS, such as a GPS signal. The positioning signal may be a signal where a navigation message is superimposed on a carrier signal comprised of a fixed frequency. The positioning signal may be modulated by code peculiar to the positioning satellite.

The positioning signals received by the antennas 201, 202, 203, and 204 may not necessarily be fully matched with each other, and may be such that a carrier phase difference can be acquired between the antennas 201, 202, 203, and 204. Note that the number of positioning signals (the number of positioning satellites) received commonly between the antennas 201, 202, 203, and 204 may be at least four.

The receiver 21 may acquire and track each positioning signal received by the antenna 201. The receiver 21 may acquire the carrier phase of each positioning signal during the tracking, and output it to the processing circuitry 30. Similarly, the receivers 22, 23, and 24 may acquire and track the positioning signals received by the antennas 202, 203, and 204, respectively. The receivers 22, 23, and 24 may acquire the carrier phases of the respective positioning signals during the tracking, and output them to the processing circuitry 30. Here, the receivers 21, 22, 23, and 24 may output code phases, code pseudo ranges or single point positioning results to the processing circuitry 30, together with the carrier phases. In more detail, the carrier phases, the code phases, and the code pseudo ranges or the single point positioning results may be outputted to at least an integer value bias determining module 32 of the processing circuitry 30.

The processing circuitry 30 may include an initial value setting module 31, the integer value bias determining module 32, a base-line vector calculating module 33, a verifying module 34, and an azimuth angle calculating module 35. The processing circuitry 30 may be provided with a processor, such as a CPU, and the memory where an azimuth angle calculation program is stored. The processor may read the azimuth angle calculation program and execute it. Thus, each functional part described above which constitutes the processing circuitry 30 can be implemented.

The initial value setting module 31 may set an initial value of the azimuth angle or an initial value of the attitude angle for determining an initial value of an integer value bias. An attitude angle acquired from a tilt sensor, such as an acceleration sensor, may be set as the initial value.

The integer value bias determining module 32 may determine the integer value bias of the carrier phase difference between the plurality of antennas 201, 202, 203, and 204, using the initial value set by the initial value setting module 31. In more detail, the integer value bias determining module 32 may choose two antennas as one group from the antennas 201, 202, 203, and 204, and determine the integer value bias of the carrier phase difference for this group. The integer value bias determining module 32 may determine the integer value bias of the carrier phase difference for each group, while changing the group of the antennas.

The base-line vector calculating module 33 may calculate two or more base-line vectors VB comprised of combinations of the plurality of antennas 201, 202, 203, and 204 by using the integer value bias. In more detail, the base-line vector calculating module 33 may calculate the base-line vector for every group of the antennas corresponding to each integer value bias, by using the integer value bias determined in the integer value bias determining module 32 described above. For example, the base-line vector for the group of the antennas 201 and 202 (the base-line vector between antennas 201 and 202) is calculated using the integer value bias of the carrier phase difference of the group of the antennas 201 and 202, and the base-line vector for the group of the antennas 201 and 203 (the base-line vector between the antennas 201 and 203) is calculated using the integer value bias of the carrier phase difference of the group of the antennas 201 and 203. The base-line vectors of other groups of the antennas may also be calculated in a similar way.

The verifying module 34 may verify the validity of the initial value set by the initial value setting module 31, using the plurality of base-line vectors VB. That is, the verifying module 34 may perform multiple base-line verifications.

If the multiple base-line verifications are successful, the azimuth angle calculating module 35 may calculate the azimuth angle of the hull 100 by using the integer value biases corresponding to the initial values which passed the verifications. Note that, in this case, the azimuth angle calculating module 35 may calculate the attitude angle of the hull 100.

Figure 4:
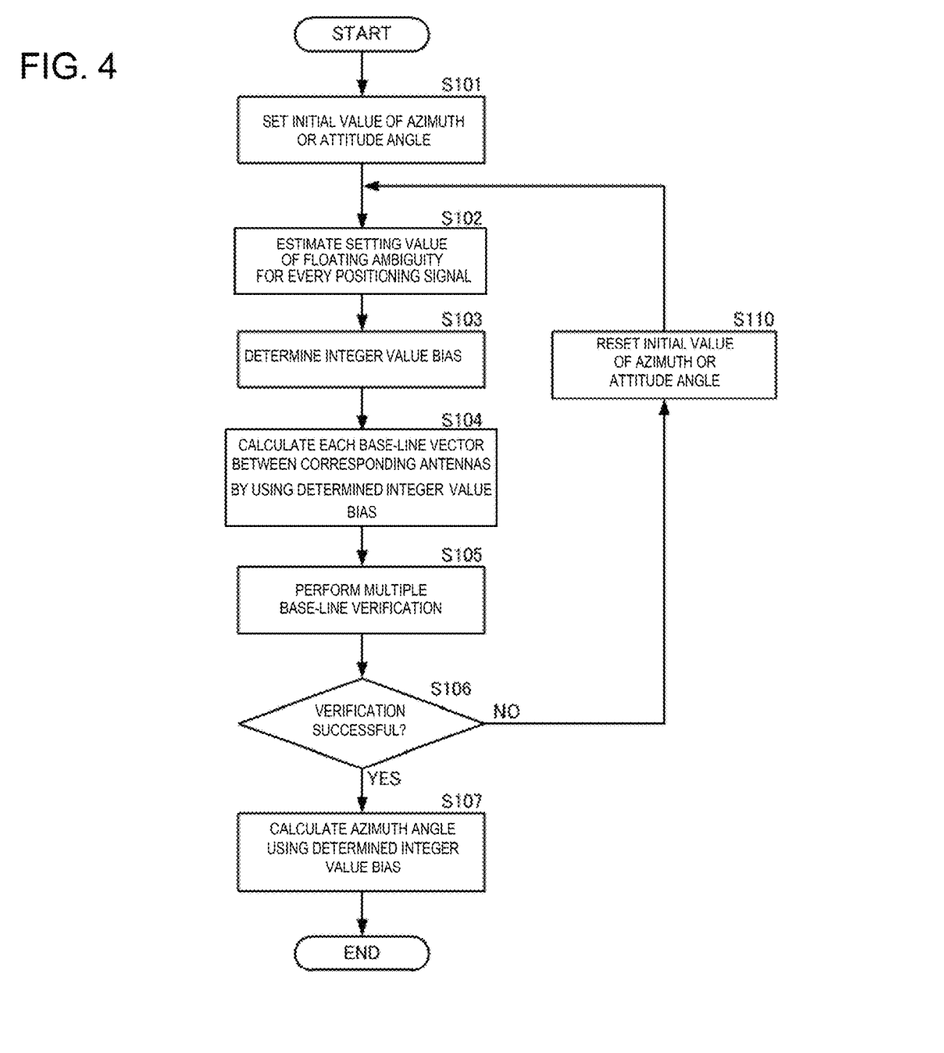
FIG. 4 is a flowchart illustrating a first processing flow of a method of calculating an azimuth angle according to the embodiment of the present disclosure.

Next, the calculation method of the azimuth angle by the processing circuitry 30 is described more concretely. FIG. 4 is a flowchart illustrating a first processing flow of the method of calculating the azimuth angle according to this embodiment of the present disclosure. Below, the processing of the processing circuitry 30 is mainly described.

The processing circuitry 30 may set the initial value of the azimuth angle or the initial value of the attitude angle (S101). The initial value of the azimuth angle or the initial value of the attitude angle may be set suitably.

The processing circuitry 30 may estimate a setting value to be set as a floating ambiguity for each positioning satellite, from the initial value of the azimuth angle or the initial value of the attitude angle (S102). In more detail, the processing circuitry 30 may calculate the positions of the antennas 201, 202, 203, and 204 using the code pseudo ranges from the receivers 21, 22, 23, and 24, respectively. The processing circuitry 30 may acquire the positions of the positioning satellites SAT1, SAT2, SAT3, and SAT4 from the navigation messages, respectively. The processing circuitry 30 may calculate direction cosines from the positions of the antennas 201, 202, 203, and 204, and the positions of the positioning satellites SAT1, SAT2, SAT3, and SAT4. The processing circuitry 30 may estimate the setting value to be set as the floating ambiguity for each positioning satellite (hereafter, simply referred to as "the floating ambiguity") based on the initial value of the azimuth angle or the initial value of the attitude angle, the positions of the antennas 201, 202, 203, and 204, and the direction cosines.

The processing circuitry 30 may determine the integer value bias for the positioning signal for each of the antennas 201, 202, 203, and 204 based on the floating ambiguity using the LAMBDA method (S103).

The processing circuitry 30 may calculate, based on each determined integer value bias, the base-line vector VB between the antennas corresponding to the integer value bias (S104). In other words, the base-line vector of each group of antennas may be calculated using the integer value bias determined for the group of antennas. The plurality of base-line vectors VB to be calculated are, for example, the base-line vectors VB12, VB23, VB34, VB41, VB13, and VB42.

The processing circuitry 30 may perform the multiple base-line verifications using the plurality of base-line vectors VB (S105). Concrete processing of the multiple base-line verifications will be described later.

If the multiple base-line verifications are successful (S106: YES), the processing circuitry 30 may calculate the azimuth angle by using the integer value bias determined at Step S103 (S107).

If the multiple base-line verifications are failed (S106: NO), the processing circuitry 30 may reset the initial value of the azimuth angle or the initial value of the attitude angle (S110). Then, the processing circuitry 30 may perform processings at and after Step S102.

Figure 5:
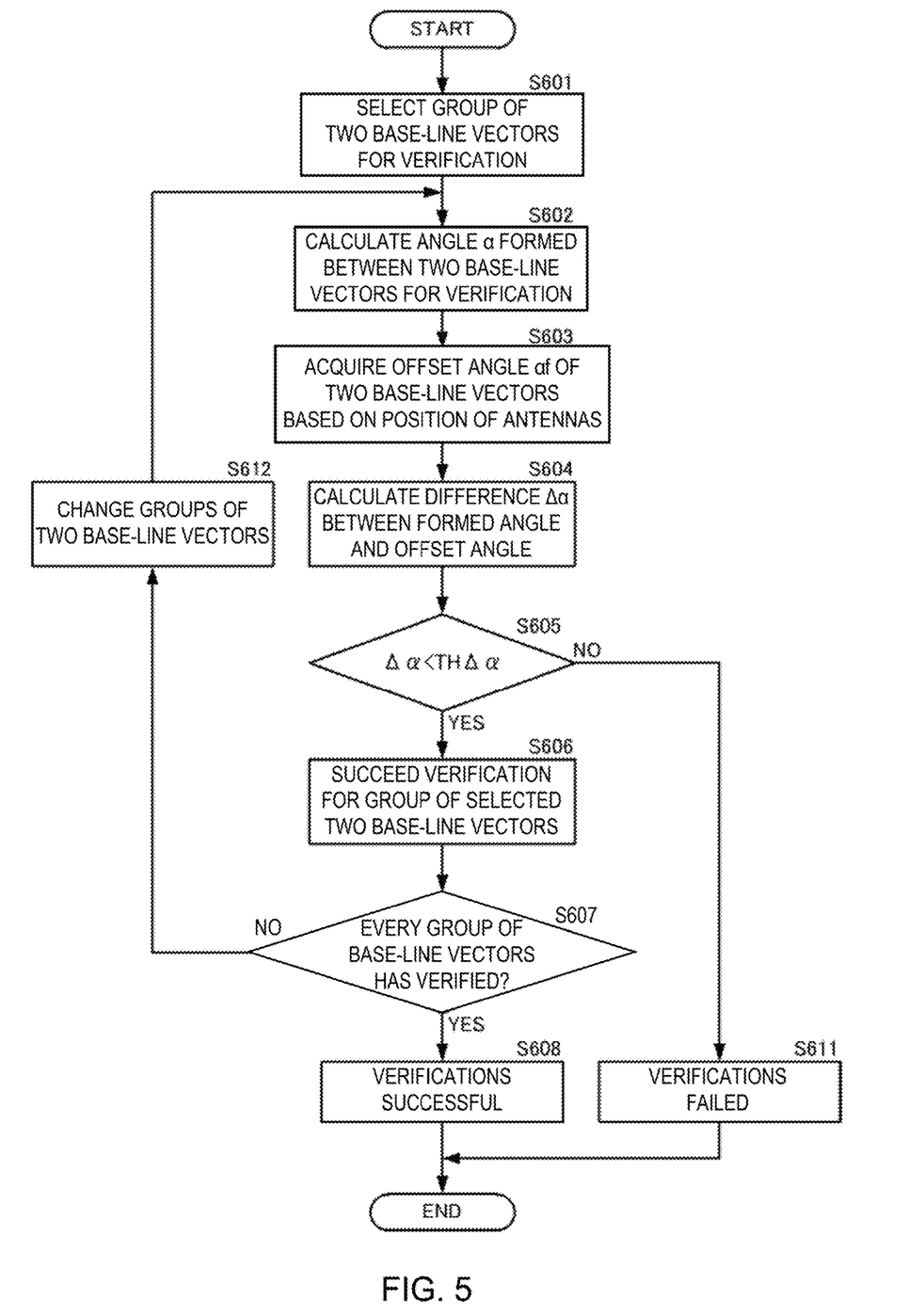
FIG. 5 is a flowchart illustrating a flow of multiple base-line verifications.

FIG. 5 is a flowchart illustrating a flow of the multiple base-line verifications.

The processing circuitry 30 may choose a group of two base-line vectors for the verification (S601). The group of base-line vectors may be a combination of the vectors which are not in parallel to each other, and at least one group may be chosen.

The processing circuitry 30 may calculate the angle α formed by the two base-line vectors for the verification (S602). The angle α may be calculated using a definitional equation of the inner product of the base-line vectors, or a definitional equation of the outer product of the base-line vectors.

The relative spatial relationship of the antennas 201, 202, 203, and 204 may be known as described above, and the angle formed by the base-line vectors may also be known. An angle which is acquired based on the arrangement may be the offset angle αf. The processing circuitry 30 stores the offset angle αf beforehand. The processing circuitry 30 acquires the offset angle αf for the two base-line vectors for the verification (S603).

The processing circuitry 30 compares the angle α with the offset angle αf, and determines whether the multiple base-line verifications is successful or failed depending on whether the comparison result is successful or failed.

In detail, the processing circuitry 30 calculates an angle difference Δα between the angle α and the offset angle αf (S604). The processing circuitry 30 stores a threshold value THΔα of the angle difference beforehand. This threshold value THΔα is determined based on an allowable error etc. for the initial values of the attitude angle and the azimuth angle.

If the angle difference Δα is below the threshold value THΔα (S605: YES), the processing circuitry 30 determines the verification for the group of the selected two base-line vectors as successful (S606).

If the processing circuitry 30 has not verified all the groups of base-line vectors (S607: NO), it changes the group of the two base-line vectors chosen (S612). The processing circuitry 30 performs the processings at and after Step S602, using the changed group of base-line vectors.

If the processing circuitry 30 has verified all the groups of base-line vectors (S607: YES), and if the verifications are successful for all the groups, it concludes that the multiple base-line verifications are successful (S608).

On the other hand, if the angle difference $\Delta\alpha$ is above the threshold value TH$\Delta\alpha$ for any one of the groups of base-line vectors (S605: NO), the processing circuitry 30 may conclude that the verifications are failed (S611).

By performing such processing, the processing circuitry 30 can determine the initial value of the azimuth angle with high precision, without using the filter processing of a Kalman filter etc. for the determination of the integer value bias (the estimation of the floating ambiguity). Thus, the processing circuitry 30 can calculate the initial value of the azimuth angle at high speed and with high precision. In addition, by determining the initial value in this way, the highly-precise azimuth angle can be calculated continuously thereafter.

Here, the accuracy of the verification can be improved by verifying the integer value bias, using the plurality of base-line vectors. Thus, the processing circuitry 30 can calculate the initial value of the attitude angle or the initial value of the azimuth angle with high precision. Further, since the azimuth angle calculating device 10 may be just provided with the receiver for the positioning signals and may not need the magnetic sensor etc., it can calculate the initial value of the attitude angle or the initial value of the azimuth angle with high precision and with the simple configuration.

Figure 6:
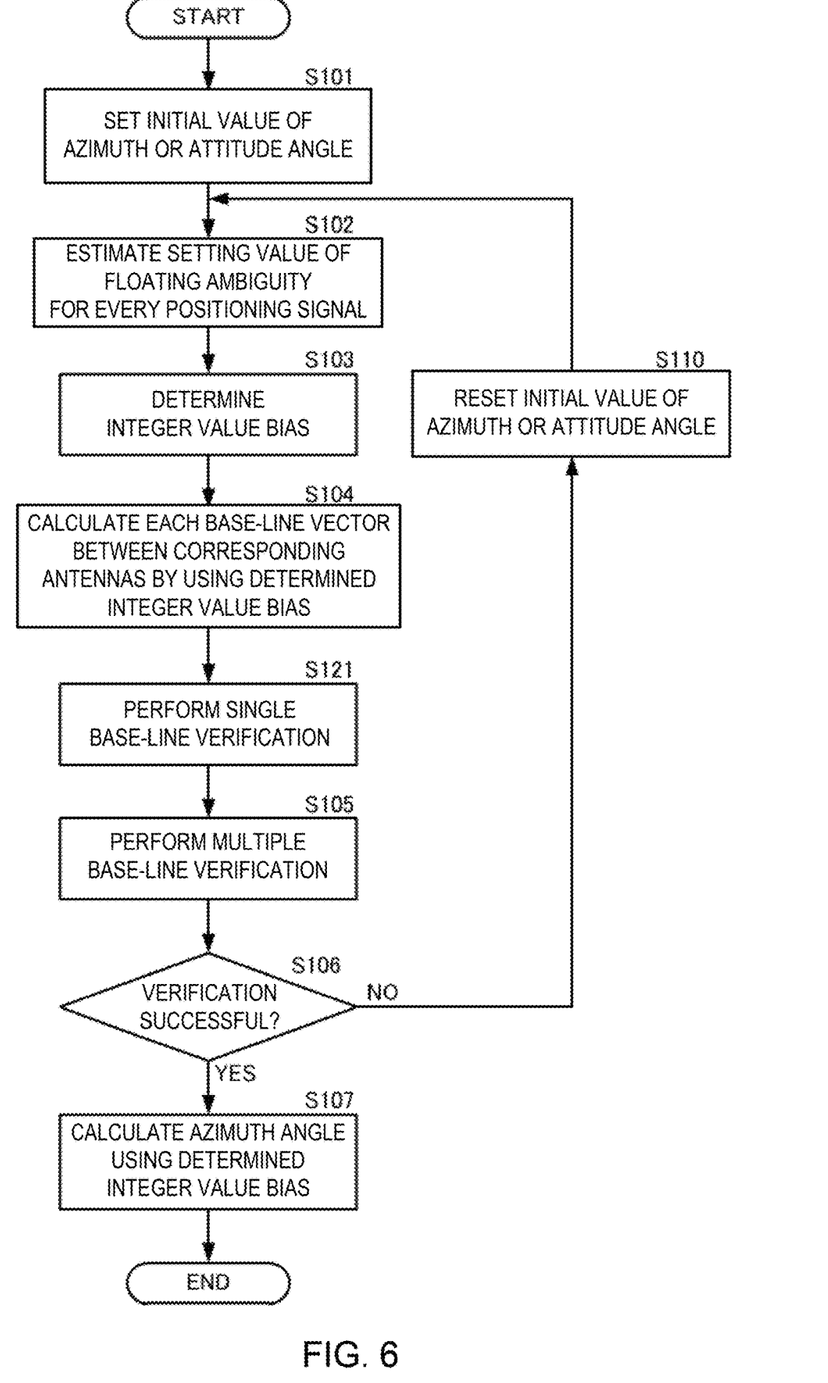
FIG. 6 is a flowchart illustrating a second processing flow of the method of calculating an azimuth angle according to the embodiment of the present disclosure.

The processing circuitry 30 may calculate the azimuth angle by the following processing. FIG. 6 is a flowchart illustrating a second processing flow of the method of calculating azimuth angle according to this embodiment of the present disclosure.

Since Steps S101, S102, S103, and S104 of FIG. 6 are the same as those illustrated in FIG. 4, the description thereof is omitted.

After the base-line vector VB is calculated at Step S104, the processing circuitry 30 may perform a single base-line verification (S121). The single base-line verification may be a verification for each of the base-line vectors VB. In detail, the processing circuitry 30 may calculate a base-line length DVB (e.g., D illustrated in FIG. 3) of the calculated base-line vector VB. The processing circuitry 30 may store the base-line length which is actually measured from the layout of the antennas 201, 202, 203, and 204 as a known base-line length Df.

The processing circuitry 30 may compare the calculated base-line length DVB with the known base-line length Df, and determine the single base-line verification is successful or failed depending on whether the comparison result is successful or failed.

In detail, the processing circuitry 30 may calculate a difference $\Delta D$ between the base-line length DVB and the known base-line length Df. The processing circuitry 30 may store a threshold value TH$\Delta D$ for the difference beforehand. This threshold value TH$\Delta D$ may be determined by an allowable error etc. for the initial values of the attitude angle and the azimuth angle.

If the difference $\Delta D$ is below the threshold value TH$\Delta D$, the processing circuitry 30 may conclude that the single base-line verification is successful. On the other hand, if the difference $\Delta D$ is above the threshold value TH$\Delta D$, the processing circuitry 30 may conclude that the single base-line verification is failed.

The processing circuitry 30 may perform the multiple base-line verifications only using the base-line vectors which passed the single base-line verifications (S105). Since the processings after the multiple base-line verifications performed by the processing circuitry 30 is the same as Steps S106, S107, and S110 illustrated in FIG. 4, the description thereof is omitted.

By performing such processing, the processing circuitry 30 can calculate the attitude angle or the azimuth angle at high speed and more accurately.

Note that, if the hull 100 or the azimuth angle calculating device 10 is provided with an inertia sensor, the processing circuitry 30 may also perform the single base-line verification using an output value of the inertia sensor. For example, the processing circuitry 30 calculates a given attitude angle (a pitch angle or a roll angle etc.) based on the base-line vector, and compares the attitude angle with an IMU attitude angle which is based on the output value of the inertia sensor. If the difference between the attitude angle based on the base-line vector and the IMU attitude angle is below a threshold value, the processing circuitry 30 may conclude that the single base-line verification is successful, and if the difference is above the threshold value, it may conclude that the single base-line verification is failed.

Note that the configuration and processing of the present disclosure act effectively as the base-line length (the distance between the antennas) may be set longer. Generally, if the base-line length is longer, a time required for the determination of the integer value bias may become longer.

However, by using the configuration and processing of the present disclosure, it may be prevented that the determination time for the integer value bias becomes longer due to the longer base-line length, and thereby, the determination time for the integer value bias can be shortened. Therefore by using the configuration and processing of the present disclosure, the initial value of the attitude angle and the initial value of the azimuth angle can be calculated with high precision and at high speed, even if the base-line length is longer.

Figure 7A:
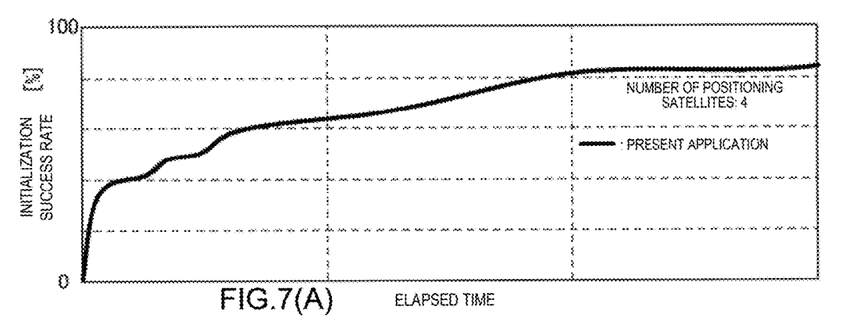
FIGS. 7(A), (B), (C), and (D) are graphs illustrating a lapsed time dependency of an initialization success rate.
Figure 7B:
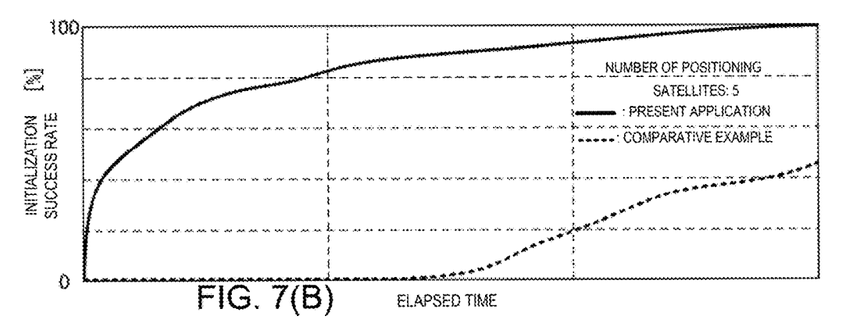
Figure 7C:
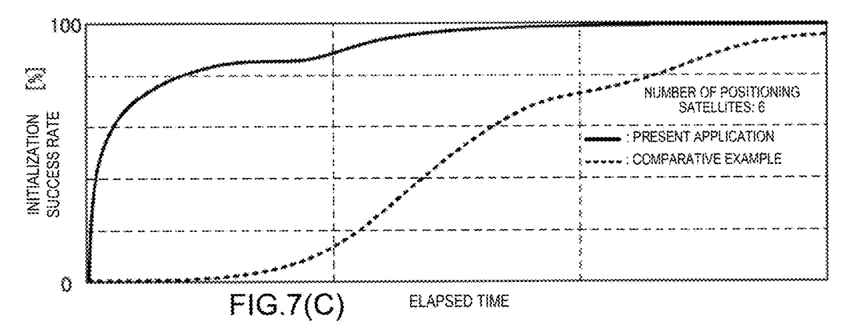
Figure 7D:
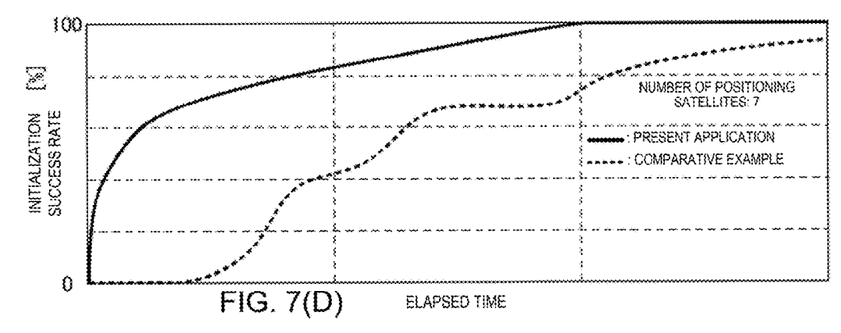

FIGS. 7(A) to (D) are graphs illustrating a lapsed time dependency of the initialization success rate. Solid lines in FIGS. 7(A) to (D) illustrate the configuration of the present disclosure, and broken lines illustrate comparative examples. The comparative examples are by a method without performing the verification of the present disclosure. FIG. 7(A) illustrates a case where the number of positioning satellites under tracking is four, FIG. 7(B) illustrates a case where the number of positioning satellites under tracking is five, FIG. 7(C) illustrates a case where the number of positioning satellites under tracking is six, and FIG. 7(D) illustrates a case where the number of positioning satellites under tracking is seven.

As illustrated in FIGS. 7(A) to (D), by using the configuration and processing of the present disclosure, the lapsed time until the initialization success rate becomes 80% or more becomes shorter, regardless of the number of positioning satellites. Moreover, as illustrated in FIGS. 7(B) to (D), by using the configuration and processing of the present disclosure, the lapsed time until the initialization success rate becomes 100% becomes shorter.

Further, by using the configuration and processing of the present disclosure, the initialization can be finished with a lesser number of positioning satellites than the comparative examples. That is, the initial value of the attitude angle and the initial value of the azimuth angle can be calculated with high precision with the lesser number of positioning satellites than the comparative examples. Particularly, by the configuration and processing of the present disclosure, the initial value of the attitude angle and the initial value of the azimuth angle can be calculated with high precision, if there is the number of positioning satellites required for the independent positioning.

Note that, although the number of antennas is four in the above description, the number of antennas may be three or more. All these antennas may be arranged at positions which are not lined up on a straight line. That is, the number of the antennas and the layout of the antennas may be determined so that at least one group of the plurality of base-line vectors which cross with each other is formed.

Moreover, in the multiple base-line verifications, at least one group of base-line vectors VB which cross with each other among the plurality of base-line vectors VB may be calculated. However, the accuracy of the verification may improve as the number of groups of base-line vectors VB to be calculated increases, and this may be more desirable.

DESCRIPTION OF REFERENCE CHARACTERS

10: Azimuth Angle Calculating Device
21, 22, 23, 24: Receiver
30: Processing Circuitry
31: Initial Value Setting Module
32: Integer Value Bias Determining Module
33: Base-line Vector Calculating Module
34: Verifying Module
35: Azimuth Angle Calculating Module
100: Hull
200: Casing
201, 202, 203, 204: Antenna
SAT1, SAT2, SAT3, SATn: Positioning Satellite
VB12, VB13, VB23, VB34, VB41, VB42, VB: Base-line Vector

What is claimed is:

1. An azimuth angle calculating device, comprising:
at least three antennas arranged at positions non-linear to each other; and
processing circuitry configured to:
set an initial value of one of an attitude angle and an azimuth angle of the azimuth angle calculating device,
determine an integer value bias of a carrier phase difference between at least two groups of antennas by using the initial value,
calculate a plurality of base-line vectors between the at least two groups of antennas, by using the integer value bias corresponding to the group of antennas,
perform a multiple base-line verification in which validity of the initial value is verified by using each of the plurality of base-line vectors calculated using the integer value bias, and
calculate an azimuth angle by using the integer value bias when the multiple base-line verification is successful.

2. The azimuth angle calculating device of claim 1, wherein the processing circuitry changes the initial value when the multiple base-line verification is failed.

3. The azimuth angle calculating device of claim 1, wherein the processing circuitry performs the multiple base-line verification by using a formed angle between the plurality of base-line vectors.

4. The azimuth angle calculating device of claim 3, wherein the processing circuitry determines that the multiple base-line verification is successful when a difference between an offset angle corresponding to an angle formed by the plurality of base-line vectors obtained beforehand based on a positional relationship of the antennas, and the formed angle is below a threshold.

5. The azimuth angle calculating device of claim 4, wherein the processing circuitry determines that the multiple base-line verification is failed when the difference is above the threshold.

6. The azimuth angle calculating device of claim 3, wherein the processing circuitry calculates the formed angle by using one of an inner product and an outer product of the plurality of base-line vectors.

7. The azimuth angle calculating device of claim 1, wherein the processing circuitry performs a single base-line verification to each of the plurality of base-line vectors and performs the multiple base-line verification by using the plurality of base-line vectors determined to be successful in the single base-line verification.

8. A method of calculating an azimuth angle, comprising:
setting an initial value of one of an attitude angle and the azimuth angle of an azimuth angle calculating device;
determining an integer value bias of a carrier phase difference between at least two groups of antennas by using the initial value;
calculating a plurality of base-line vectors between the at least two groups of antennas, by using the integer value bias corresponding to the group of antennas;
performing a multiple base-line verification in which validity of the initial value is verified by using the plurality of base-line vectors calculated using the integer value bias; and
calculating the azimuth angle by using the integer value bias when the multiple base-line verification is determined to be successful.

9. The azimuth angle calculating method of claim 8, wherein the multiple base-line verification is performed using an angle formed between the plurality of base-line vectors.

10. The azimuth angle calculating method of claim 9, wherein the multiple base-line verification is determined to be successful when an angular difference between an offset angle corresponding to an angle formed between the plurality of base-line vectors obtained beforehand based on a positional relationship among the antennas, and the formed angle is below a threshold.

11. The azimuth angle calculating method of claim 10, wherein the multiple base-line verification is determined to be failed when the difference is above the threshold.

12. The azimuth angle calculating method of claim 9, wherein in the multiple base-line verification, the formed angle is calculated by using one of an inner product and an outer product of the plurality of base-line vectors.

13. The azimuth angle calculating method of claim 9, wherein a single base-line verification is performed to each of the plurality of base-line vectors before the multiple base-line verification and the multiple base-line verification is performed by using the plurality of base-line vectors determined to be successful in the single base-line verification.

* * * * *